United States Patent
Kant et al.

(10) Patent No.: US 8,555,747 B2
(45) Date of Patent: Oct. 15, 2013

(54) AIR COOLED GEAR HOUSING

(75) Inventors: Aarnout Kant, Dinxperlo (NL); Hubert Pessel, Dinxperlo (NL); Jürgen Thuilot, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 1531 days.

(21) Appl. No.: 11/009,422

(22) Filed: Dec. 10, 2004

(65) Prior Publication Data

US 2006/0000301 A1    Jan. 5, 2006

(30) Foreign Application Priority Data

Jun. 22, 2004   (DE) .................. 10 2004 030 180

(51) Int. Cl.
*F16H 57/02*    (2012.01)
*F16H 1/16*    (2006.01)

(52) U.S. Cl.
USPC ..................... 74/606 A; 74/606 R

(58) Field of Classification Search
USPC ..................... 74/606 A, 606 R, 42
See application file for complete search history.

(56) References Cited

U.S. PATENT DOCUMENTS

| | | | | |
|---|---|---|---|---|
| 2,147,391 A | * | 2/1939 | Acker | 74/606 A |
| 2,481,914 A | * | 9/1949 | Eastman et al. | 74/606 A |
| 2,511,479 A | * | 6/1950 | Olah | 184/11.1 |
| 2,548,805 A | * | 4/1951 | Moir et al. | 74/606 A |
| 2,600,912 A | * | 6/1952 | Olson | 74/421 R |
| 3,353,591 A | * | 11/1967 | Zak | 165/47 |
| 3,667,318 A | * | 6/1972 | Lock | 74/609 |
| 3,710,646 A | * | 1/1973 | Bogan | 74/609 |
| 4,074,590 A | * | 2/1978 | Jorg | 74/606 A |
| 4,630,945 A | * | 12/1986 | Gerling | 384/320 |
| 4,872,502 A | * | 10/1989 | Holzman | 165/299 |
| 5,012,861 A | * | 5/1991 | Kunze et al. | 165/47 |
| 5,070,958 A | | 12/1991 | Goodrich, Jr. et al. | |
| 5,207,121 A | * | 5/1993 | Bien | 74/606 R |
| 5,505,101 A | * | 4/1996 | Curtis | 74/417 |
| 5,517,899 A | | 5/1996 | Bohner | |
| 5,575,193 A | | 11/1996 | Bareis et al. | |
| 6,073,517 A | * | 6/2000 | Pauwels et al. | 74/606 R |
| 7,066,046 B1 | * | 6/2006 | Gibson | 74/425 |
| 2002/0139210 A1 | * | 10/2002 | Blanchard | 74/425 |

FOREIGN PATENT DOCUMENTS

| | | |
|---|---|---|
| BE | 527697 | 4/1954 |
| DE | 589 762 | 12/1933 |
| DE | 858 920 | 10/1952 |
| DE | 858 920 | 12/1952 |
| DE | 1 984 404 | 4/1968 |
| DE | 43 15 895 | 11/1994 |
| DE | 101 31 753 | 1/2003 |

(Continued)

*Primary Examiner* — Richard W Ridley
*Assistant Examiner* — Thomas Diaz
(74) *Attorney, Agent, or Firm* — Henry M. Feiereisen LLC

(57) ABSTRACT

A spur-gear mechanism, especially a bevel spur-gear mechanism, having one or more transmission stages is provided. The transmission stages are accommodated in a gear mechanism housing having two side surfaces and two base surfaces. Guided out of the gear mechanism housing is a drive shaft on which is fixedly secured, beyond a housing, an axial fan wheel. A spacer flange for connection to a motor spacer is formed on the gear mechanism housing. The spacer flange is provided with central openings in an extension of the base surfaces and with lateral openings in an extension of the side surfaces.

3 Claims, 3 Drawing Sheets

(56) References Cited

FOREIGN PATENT DOCUMENTS

| | | |
|---|---|---|
| FR | 527697 | 4/1954 |
| GB | 294317 | 8/1928 |
| GB | 1090342 | 11/1964 |
| GB | GN 1090342 | 11/1967 |
| GB | 2 282 206 | 3/1995 |

* cited by examiner

000
AIR COOLED GEAR HOUSING

BACKGROUND OF THE INVENTION

The present invention relates to a spur-gear mechanism, especially a bevel spur-gear mechanism, having one or more transmission stages.

Gear mechanisms having a bevel gear stage are a generally known structural approach in order, in addition to the important mechanical values of speed and torque, to also alter the spatial position between the drive shaft and the output shaft. The axes of the drive shaft and the output shaft are customarily offset relative to one another by an angle of 90°. Particularly economical is the use of the bevel gear set as the first stage in a generally multi-staged gear mechanism. In particular for drives of conveyor belt units, bevel spur-gear mechanisms enable the parallel alignment of drive and conveyor belt unit.

With a minimal number of individual components, a universal gear mechanism series can be produced that encompasses many structural sizes. The individual components are technically designed in an optimum characteristic curve. Due to the high reproducing frequency of individual components in various variations, this concept additionally has special economical advantages.

There exists for a plurality of comparable gear mechanism series according to the mechanical assembly technique a program that includes not only spur-gear mechanisms but also bevel spur-gear mechanisms. The gear mechanisms are available for all conceivable installation positions and with different types of constructions of the drive and output shafts. Characteristic is the use of an extensively unaltered base housing not only for the spur-gear mechanism but also for the bevel spur-gear mechanism. Alternatively, further auxiliary components, such as block or return lockings and brakes are also available.

Derived from the existing program are product programs that are adapted for special branch strong points and that utilize the advantages of the existing universal structural series, and which at the same time are limited to the assembly of branch-conventional variants. For conveyor belt drives, essentially two-stage and three-stage bevel spur-gear mechanisms are used. For three-stage bevel spur-gear mechanisms, a special variant having a surface of the gear mechanism housing that is enlarged by cooling ribs is also provided.

The drawback of the concept of a universal mechanical assembly gear mechanism is, for branch-specific applications, the prevailing use of identical components. This includes, in particular, the gear mechanism housing. In addition to the mechanical stress, the thermal limiting output is a determinative design criterion for conveyor belt drives. Since in general in surface working or mining, or similar applications, no cooling water is available for the conveyance of loose material, and the use of other cooling and lubricating means, such as oleo or oil/air coolers, is not possible for various reasons, the entire gear mechanism heat must be given off to the air via convection. In addition, the raw environmental conditions that exist at the use site in question, and which have a high occurrence of dust, make the maintenance of the heat withdrawal more difficult, since dust layers that are deposited on the gear mechanism housing have an insulating effect. Known in this connection are bevel spur-gear mechanisms having a housing surface that is enlarged by cooling ribs, and having an axial fan wheel disposed on the drive shaft.

It is an object of the present invention to alter the bevel spur-gear mechanism of the aforementioned general type for use as a conveyor belt drive in such a way that under specific optimization of the housing form, the quantity of heat that is carried off by convection can be permanently increased.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The spur-gear mechanism of the present application comprises a gear mechanism housing that surrounds the transmission stages and is provided with two side surfaces and two base surfaces, wherein cooling ribs are disposed on the side surfaces and the base surfaces; an axial fan wheel fixedly disposed on a drive shaft externally of the gear mechanism housing; and a spacer flange for connection to a motor spacer, wherein the spacer flange is formed on the gear mechanism housing, and wherein the spacer flange is provided with central openings in an extension of the base surfaces and with lateral openings in an extension of the side surfaces.

Further specific features of the present application will be described in detail subsequently.

DESCRIPTION OF SPECIFIC EMBODIMENTS

Figure 1:
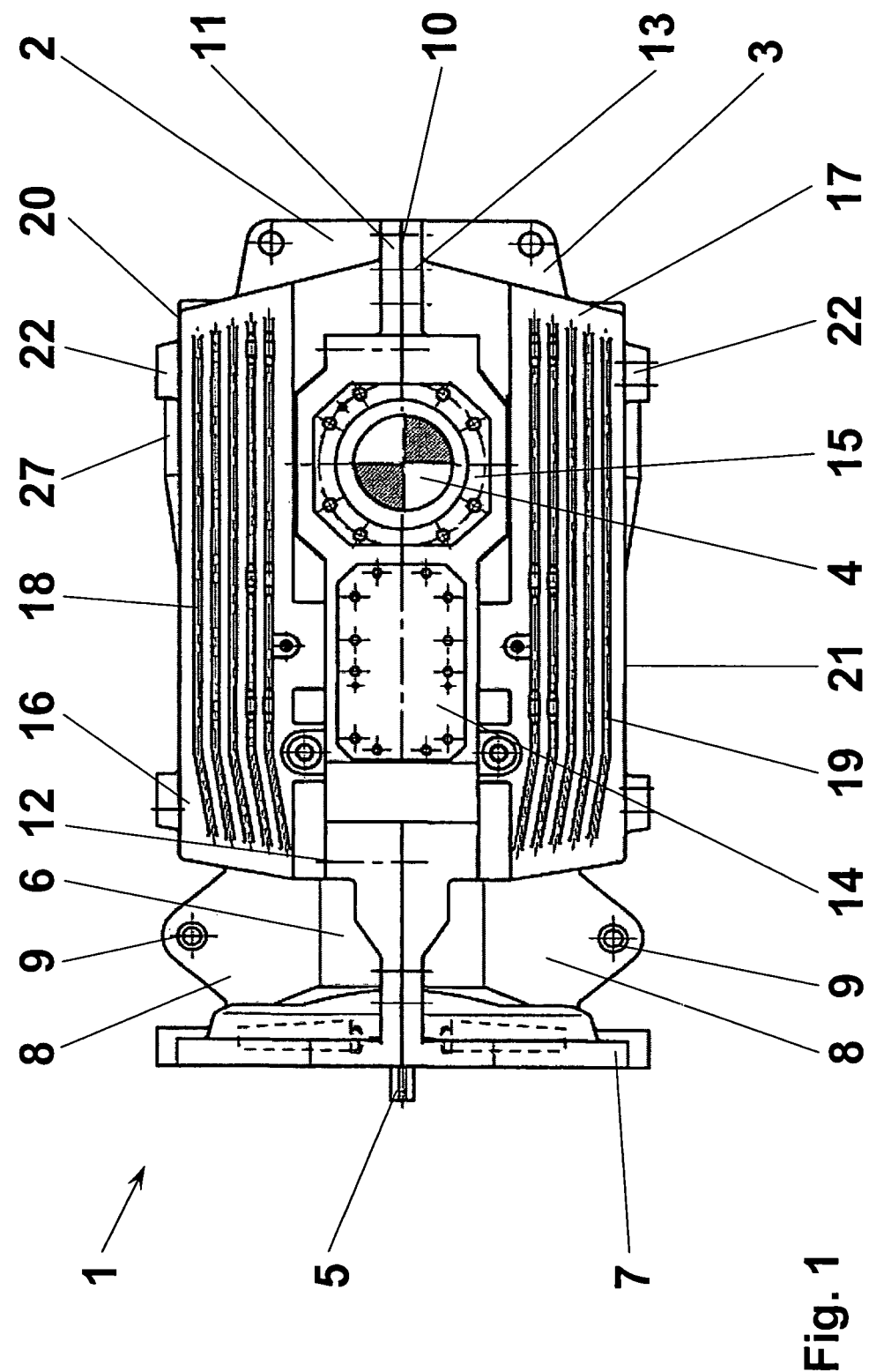
FIG. 1 is a side view of a bevel spur-gear mechanism of one exemplary embodiment of the present application.

Referring now to the drawings in detail, illustrated in FIG. 1 is a spur-gear mechanism that is embodied as a bevel spur-gear mechanism 1. The bevel spur-gear mechanism 1 is provided with an upper housing portion 2 and a lower housing portion 3, which have a symmetrical configuration and can be cast in the same mold. The engagement of the drive is, in the illustrated embodiment, effected by the connection of the output shaft 4 to a non-illustrated unit, which is preferably a conveyor belt unit for conveying loose or bulk material. The output shaft 4 is embodied as a solid shaft, and is connected via a non-illustrated flange coupling to a work machine of the unit. Alternatively, where a hollow shaft is used, the drive is embodied as an extension or insertion means. The drive power passes into the gear mechanism from a non-illustrated drive motor via a drive shaft 5.

The drive shaft 5 is a part of the bevel gear stage of the gear mechanism. Due to the low mechanical stressing that occurs in the first transmission stage, the relatively expensive to manufacture bevel gear toothing is provided at the input side. The drive shaft 5 projects out of the end face of the gear mechanism housing, and is supported in a housing core 6 that is connected with the gear mechanism housing. Disposed on the housing core 6, in the direction of the shaft input, is a spacer flange 7 for the connection of a motor flange; the spacer flange will be described in greater detail subsequently. Reinforcing ribs 8 are secured in a vertical plane to the upper and lower side of the housing collar 6. The reinforcing ribs 8 are provided with pivot or wrist or knuckle points 9 for the connection of a pivotable torque support means.

Mounted on both sides of a horizontal parting line 10 are housing collars 11, 12 that extend about the upper housing portion 2 and the lower housing portion 3. The housing collars 11, 12 form flange-like projections that serve for receiving housing screws 13, via which the upper housing portion 2 and the lower housing portion 3 are bolted to one another.

Disposed in the side surfaces 16, 17 of the upper housing portion 2 and of the lower housing portion 3 are bosses or hubs for receiving the shafts of the transmission stages and the output shaft. As do the housing collars 11, 12, these hubs project out of the side surfaces 16, 17 and offer the required installation space for further housing screws between the transmission stages. The hubs are closed off by a closed housing cover 14, while the hub of the output shaft 4 is covered by an open housing cover 15.

Alternatively, the closed housing cover 14 can be replaced by an open housing cover in order to be able to use extended shafts of the intermediate stages. Possible auxiliary units, such as, for example, an auxiliary drive, a back stop or a speed monitor, can then be connected thereto.

Cooling ribs 18, 19 are disposed on the side surfaces 16, 17 of the upper housing portion 2 and of the lower housing portion 3; these cooling ribs extend parallel to one another over the entire length of the gear mechanism housing. The cooling ribs 18, 19 increase the surface of the housing and improve the thermal transfer from the gear mechanism to the environment.

On the sides opposite the parting line 10, the upper housing portion 2 is closed off by a base surface 20, and the lower housing portion 3 is closed off by a base surface 21. Provided on the base surfaces 20, 21 are feet 22 that during the manufacture serve as alignment surfaces, and during transport and assembly serve as housing feet. For a gear mechanism having feet, there are located at these location the receiving points of the base screws.

Figure 2:
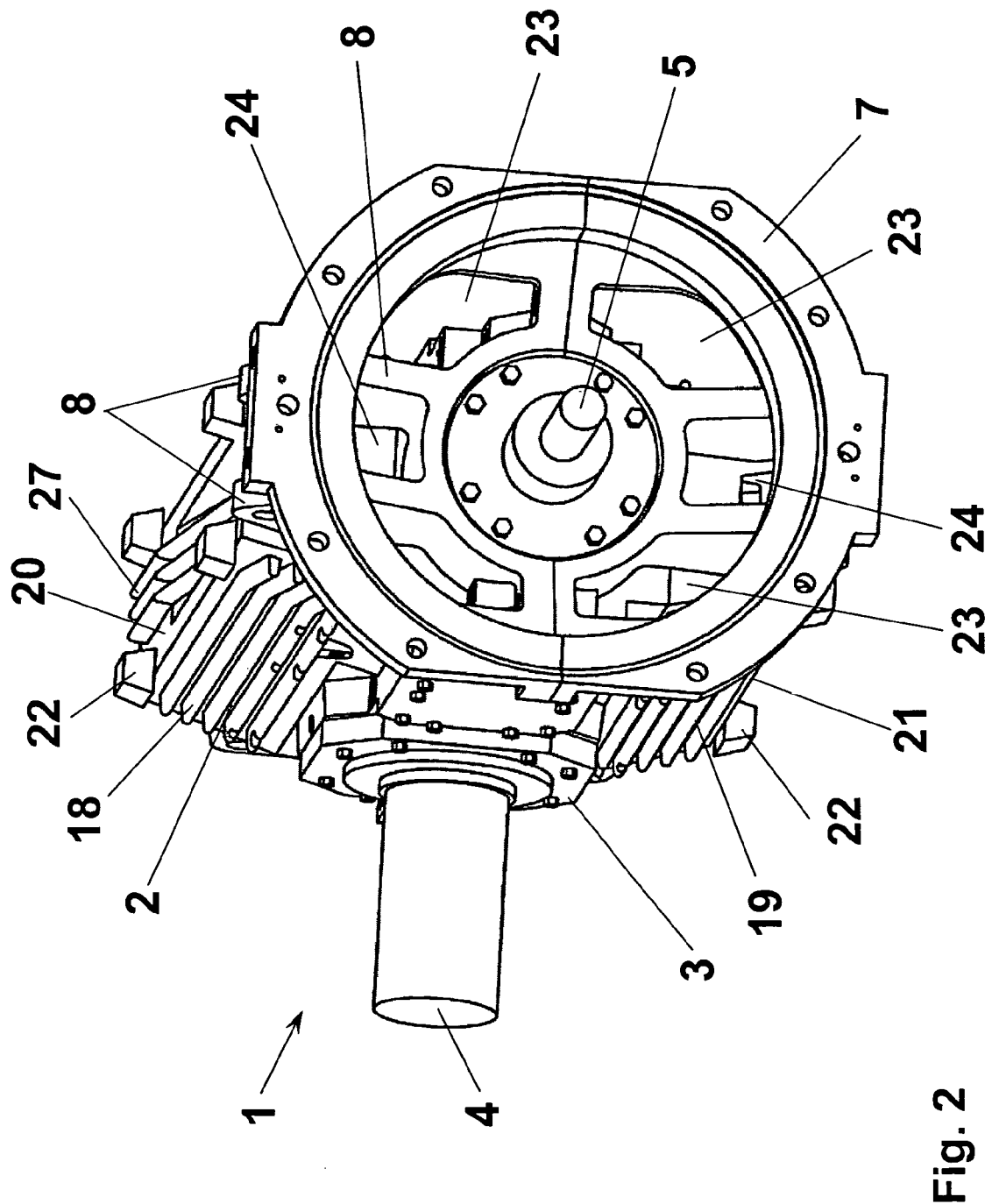
FIG. 2 is a spatial view on the side of the drive shaft of the bevel spur-gear mechanism of FIG. 1.

The spatial illustration of the bevel spur-gear mechanism 1 of FIG. 2 clearly shows the inventively improved air stream guidance. The base of the spacer flange 7 is provided with lateral openings 23 and central openings 24, which pass through the spacer flange 7 on both sides of a horizontal central plane in the longitudinal direction of the gear mechanism. The inner edge of each of the lateral openings 23 is disposed in the extension of the side surfaces 16, 17, and the inner edges of each of the central openings 24 are disposed in the extension of the base surfaces 20, 21 of the gear mechanism housing. Only with the procedural engineering control of the casting technology of expensive components having very different material distribution in this considerable spatial extension is the direct, positive connection of the spacer flange 7 to the housing collar 6 of the bevel spur-gear mechanism 1 made possible. By forming the spacer flange 7 on the housing collar 6, the latter, together with the upper housing portion 2 and the lower housing portion 3, respectively form one component and thus represent a portion of the gear mechanism housing. As a consequence of this advantageous configuration, the gear mechanism is shorter.

Via the openings 23, 24 the air flows out of the motor spacer connected to the spacer flange along all sides (side surfaces 16, 17, base surfaces 20, 21) of the bevel spur-gear mechanism 1. To achieve an adequate rigidity of the construction of the spacer flange 7, two reinforcing ribs 8 are mounted between the lateral openings 23 and the central opening 24. At the same time, the reinforcing ribs 8 form a flow channel 25 (see FIG. 3) that conveys the air along the base surfaces 20 and 21.

The upper base surface 20 and the lower base surface 21 are advantageously inclined in a direction toward the central openings 24 in the spacer flange 7, as a consequence of which slopes 26 result that represent the continuation of the flow channel 25. Mounted on the base surfaces 20, 21 are cooling ribs 27 to improve the thermal transfer. Even for the situation where the gear mechanism, having a foot configuration, rests directly on the ground, the slope 26 permits the guidance of air through below the gear mechanism.

Not only does air flow through the central openings 24, but it also flows through the lateral openings 23 along the cooling ribs 18, 19 of the side surfaces 16, 17. The cooling ribs 18, 19 extend via a slight bend toward the lateral openings 23 of the spacer flange 7, and are thereby adapted to the air flow in the direction of the housing collar 6. By means of this slight bend, the air stream is conveyed to the end of the overall side surfaces 16, 17 of the gear mechanism housing.

The continuous air stream guidance without abrupt jumps or transitions at all delimiting or outer surfaces (side surfaces 6, 17, 20, 21) leads to a distinctly improved thermal transfer to the air of the environment or atmosphere due to forced convection. In addition, the guided air stream prevents the dust that is always present in the surrounding air from being deposited on the gear mechanism housing and forming insulating dirt nests or pockets.

In contrast to the inventive gear mechanism housing, the housing molds of the known universal gear mechanisms for a conveyor belt drive must also take into consideration the requirements of other applications. This compromise leads to a poor heat balance, which in this application leads to an uneconomical over-dimensioning of the drive.

Figure 3:
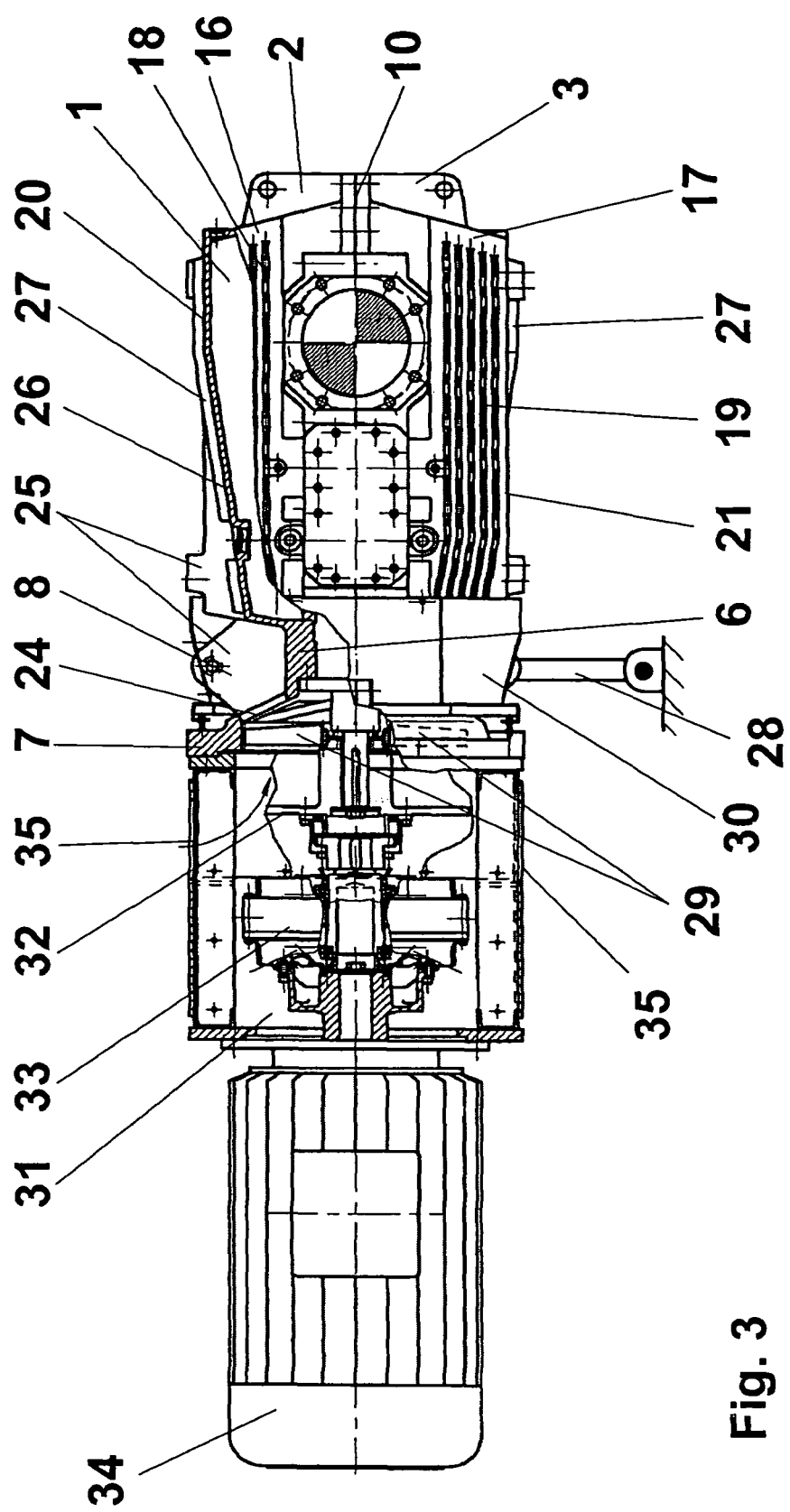
FIG. 3 is a side view and partially cross-sectioned view of a further embodiment of the present application showing the construction of a typical conveyor belt drive.

The illustration of the further embodiment in FIG. 3 shows the overall drive train of a conveyor belt drive using a bevel spur-gear mechanism 1. The gear mechanism housing is supported on a base or a machine frame via a torque support means 28, which engages in the wrist or knuckle points 9 of the reinforcing ribs 8.

The drive shaft 5 of the bevel spur-gear mechanism 1 is connected via a brake 32 and a fluid coupling 33 with the output shaft of an electric motor 34 that serves as a drive means. The electric motor 34 is flanged to the gear mechanism housing via a motor spacer 31 and the spacer flange 7. The motor spacer 31 is designed for the connection of the electric motor 34, which is embodied as a flange motor. Since the motor spacer 31 must transfer considerable weight forces to the drive bearing at the output shaft 4, here also, via the spacer flange 7 that is cast on the housing collar 6 of the gear mechanism housing, a shortened connection of gear mechanism housing and electric motor 34 is an advantageous structural approach.

Directly following the spacer flange 7, an axial fan wheel 29 is fixedly secured directly to the drive shaft 5 of the bevel spur-gear mechanism 1. The motor spacer 31 is provided with adequately large air inlet openings 35. For operational reliability, these air inlet openings 35 are provided with here not illustrated components to protect against engagement or access, or with dust-deflecting hoods. The axial fan wheel 29 which is mounted directly on the drive shaft 5 rotates with the high motor speed. As a result, the conveyance of a large air stream is ensured in every operating state. This air stream passes through the openings 23, 24 in the spacer flange 7, and is guided along the cooling ribs 18, 19, 27 at the side surfaces 16, 17, and the base surfaces 20, 21.

The effect of the air flow can be further increased by the use of an air-conducting hood 30, which surrounds the housing collar 6 following the spacer flange 7. The inner diameter of the air-conducting hood 30 is slightly greater than the radially greatest dimensions of the openings 23, 24 in the spacer flange 7. Thus, the overall air flow, in an annular channel between housing collar 6 and air-conducting hood 30, is guided directly and with little loss to the warmest locations at the side surfaces 16, 17 and base surfaces 20, 21.

The specification incorporates by reference the disclosure of German priority document 10 2004 030 180.8 filed Jun. 22, 2004.

The present invention is, of course, in no way restricted to the specific disclosure of the specification and drawings, but also encompasses any modifications within the scope of the appended claims.

What we claim is:

1. A spur-gear mechanism, comprising:
    a drive shaft for transmitting a driving power from a motor, said drive shaft defining an axis;
    a split housing surrounding transmission stages of the spur-gear mechanism and including an upper housing portion and a lower housing portion;
    an axial fan wheel fixedly disposed on said drive shaft and drawing air axially from the motor to force the drawn air to flow in a direction of the axis through the split housing in substantial parallel relationship to the drive shaft;
    a split spacer flange formed in one piece with the upper and lower housing portions, respectively, and including first openings extending at a slant to outwardly direct a flow of air drawn in by the axial fan from the motor to flow across inclined outer base surfaces of the housing;
    first cooling ribs disposed on side surfaces of the housing in flow communication with second openings of the spacer flange and bent inwards towards the second openings;
    second cooling ribs disposed on the base surfaces of the housing in flow communication with the first openings of the spacer flange and bent inwards towards the first openings; and
    reinforcing ribs formed on the spacer flange between the first and second openings.

2. The spur-gear mechanism of claim 1, wherein upper and lower ones of the base surfaces are inclined in a direction toward the first openings in the spacer flange.

3. The spur-gear mechanism of claim 1, further comprising an air-conducting hood provided between the spacer flange and outer surfaces of the housing on a front side of the housing, said air-conducting hood having an inner diameter which is greater than radially largest dimensions of the first and second openings in the spacer flange.

* * * * *

UNITED STATES PATENT AND TRADEMARK OFFICE
CERTIFICATE OF CORRECTION

PATENT NO.        : 8,555,747 B2  
APPLICATION NO.   : 11/009422  
DATED             : October 15, 2013  
INVENTOR(S)       : Aarnout Kant et al.

It is certified that error appears in the above-identified patent and that said Letters Patent is hereby corrected as shown below:

On the Title page, Item (54) and in the Specification, Column 1, the Title:

Change "AIR COOLED HOUSING GEAR" TO --SPUR-GEAR MECHANISM--.

Signed and Sealed this  
Seventh Day of January, 2014

Margaret A. Focarino  
*Commissioner for Patents of the United States Patent and Trademark Office*